(12) United States Patent
Berentsen et al.

(10) Patent No.: US 9,900,750 B2
(45) Date of Patent: Feb. 20, 2018

(54) COMMUNICATING WITH ISOLATED MOBILE DEVICES IN INDOOR POSITIONING SYSTEMS

(71) Applicant: International Business Machines Corporation, Armonk, NY (US)

(72) Inventors: Lambert S. Berentsen, Jonestown, TX (US); Gregory J. Boss, Saginaw, MI (US); Rick A. Hamilton, II, Charlottesville, VA (US); James R. Kozloski, New Fairfield, CT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/434,207

(22) Filed: Feb. 16, 2017

(65) Prior Publication Data

US 2017/0164160 A1    Jun. 8, 2017

Related U.S. Application Data

(63) Continuation of application No. 14/810,822, filed on Jul. 28, 2015.

(51) Int. Cl.
| | |
|---|---|
| *H04W 36/00* | (2009.01) |
| *H04W 4/04* | (2009.01) |
| *H04W 8/00* | (2009.01) |
| *H04W 84/18* | (2009.01) |

(52) U.S. Cl.
CPC .......... *H04W 4/043* (2013.01); *H04W 8/005* (2013.01); *H04W 84/18* (2013.01)

(58) Field of Classification Search
CPC .................................................... H04W 4/043

USPC .............................................. 455/456.1, 11.1
See application file for complete search history.

(56) References Cited

U.S. PATENT DOCUMENTS

| | | |
|---|---|---|
| 5,355,511 A | 10/1994 | Hatano et al. |
| 8,830,792 B2 | 9/2014 | Taylor et al. |
| 8,856,029 B1 | 10/2014 | Khan |
| 9,110,159 B2 | 8/2015 | Vartanian et al. |
| 9,319,471 B2 | 4/2016 | Diem |
| 9,491,588 B1 | 11/2016 | Biehl et al. |
| 2002/0114350 A1 | 8/2002 | Tang et al. |
| 2005/0136845 A1 | 6/2005 | Masuoka et al. |
| 2006/0095348 A1 | 5/2006 | Jones et al. |
| 2010/0052991 A1 | 3/2010 | Smith et al. |
| 2011/0037599 A1 | 2/2011 | Johnson, Jr. et al. |
| 2012/0316938 A1 | 12/2012 | Moshfeghi |
| 2014/0087758 A1 | 3/2014 | Maor |

(Continued)

OTHER PUBLICATIONS

Gagliordi, Natalie, "Apple iBeacon challengers multiply: A look at five rivals", ZDnet, Jun. 24, 2014, pp. 1-7, <http://www.zdnet.com/article/apple-ibeacon-challengers-multiply-a-look-at-five-rivals/.

(Continued)

*Primary Examiner* — Charles Shedrick
(74) *Attorney, Agent, or Firm* — Aaron N. Pontikos

(57) ABSTRACT

Communicating with isolated mobile devices in indoor positioning systems is provided. Information is received from a first mobile device connected to both a first network of a designated environment and a second mobile device that is not connected to the first network. The information includes one or more identifiers of the second mobile device. An estimated location of the second mobile device is determined based, at least in part, on the information received from the first mobile device.

18 Claims, 4 Drawing Sheets

(56) References Cited

U.S. PATENT DOCUMENTS

2014/0094196 A1   4/2014   Mahoney
2014/0250191 A1   9/2014   Altman et al.
2015/0201317 A1   7/2015   Kuusilinna et al.
2016/0100282 A1   4/2016   Pounds et al.
2017/0034668 A1   2/2017   Berentsen et al.

OTHER PUBLICATIONS

"iBeacon", Wikipedia, the free encyclopedia, This page was last modified on Apr. 9, 2015, pp. 1-5, <http://en.wikipedia.org/wiki/IBeacon>.

"IBM MobileFirst Platform Presence Insights", Printed on Apr. 10, 2015, pp. 1-2, <http://www-03.ibm.com/software/products/en/ibm-mobilefirst-platform-presence-insigts>.

"Indoor positioning system", Wikipedia, the free encyclopedia, This page was last modified on Mar. 26, 2015, pp. 1-6, <http://en.wikipedia.org/wiki/Indoor_positioning_system>.

"Powerful, personalized, mobile engagement in the physical world", Gimbal, Printed on Apr. 10, 2015, pp. 1-5, <http://gimbal.com/>.

IBM, Appendix P, List of IBM Patents or Patent Applications Treated as Related, dated Feb. 20, 2017, 2 pages.

COMMUNICATING WITH ISOLATED MOBILE DEVICES IN INDOOR POSITIONING SYSTEMS

TECHNICAL FIELD

The present invention relates generally to the field of indoor positioning systems and, more particularly, to communicating with isolated mobile devices in indoor positioning systems.

BACKGROUND OF THE INVENTION

An indoor positioning system (IPS) is a solution use to locate objects or people inside a building using radio waves, magnetic fields, acoustic signals, or other sensory information collected by mobile devices. IPS solutions rely on different technologies, such as, for example, distance measurement to nearby anchor nodes with known positions (e.g., wireless local area network access points), magnetic positioning, or dead reckoning. IPS solutions can actively locate mobile devices and tags or provide ambient location or environmental context for devices to be sensed (i.e., detected).

SUMMARY

According to one embodiment of the present disclosure, a method is provided. The method includes receiving, by one or more processors, information from a first mobile device connected to both a first network of a designated environment and a second mobile device that is not connected to the first network, wherein the information includes one or more identifiers of the second mobile device; and determining, by one or more processors, an estimated location of the second mobile device based, at least in part, on the information received from the first mobile device.

According to another embodiment of the present disclosure, a computer program product is provided. The computer program product comprises a computer readable storage medium and program instructions stored on the computer readable storage medium. The program instructions include program instructions to receive information from a first mobile device connected to both a first network of a designated environment and a second mobile device that is not connected to the first network, wherein the information includes one or more identifiers of the second mobile device; and program instructions to determine an estimated location of the second mobile device based, at least in part, on the information received from the first mobile device.

According to another embodiment of the present disclosure, a computer system is provided. The computer system includes one or more computer processors, one or more computer readable storage media, and program instructions stored on the computer readable storage media for execution by at least one of the one or more processors. The program instructions include program instructions to receive information from a first mobile device connected to both a first network of a designated environment and a second mobile device that is not connected to the first network, wherein the information includes one or more identifiers of the second mobile device; and program instructions to determine an estimated location of the second mobile device based, at least in part, on the information received from the first mobile device.

DETAILED DESCRIPTION

Embodiments of the present invention recognize that understanding and influencing consumer behavior in real time is an increasingly important focus area for organizations and their IT providers. Use of indoor positioning systems and communicating to unique customers is an active area for many organizations. Technologies and tools that enable organizations to detect unique customers and determine customers' locations and movements within a designated environment are growing in pervasiveness and business value, as they allow organizations to perform web-type analytics for physical venues and deliver customer-centric offers.

Embodiments of the present invention provide for locating and communicating with isolated mobile devices in indoor positioning systems. Various embodiments provide for detecting a first mobile device, sometimes referred to as an isolated mobile device, determining a location of the isolated mobile device, tracking movements of the isolated mobile device, and delivering information to the isolated mobile device using a known mobile device as a proxy. Although the present invention describes a solution for an indoor positioning system, a person skilled in the art will recognize that this invention will apply to any designated environment (e.g., outdoor marketplace, subway stations, parking lots, sports venues) that uses a positioning system with a network that does not rely on global positioning system satellites.

Figure 1:
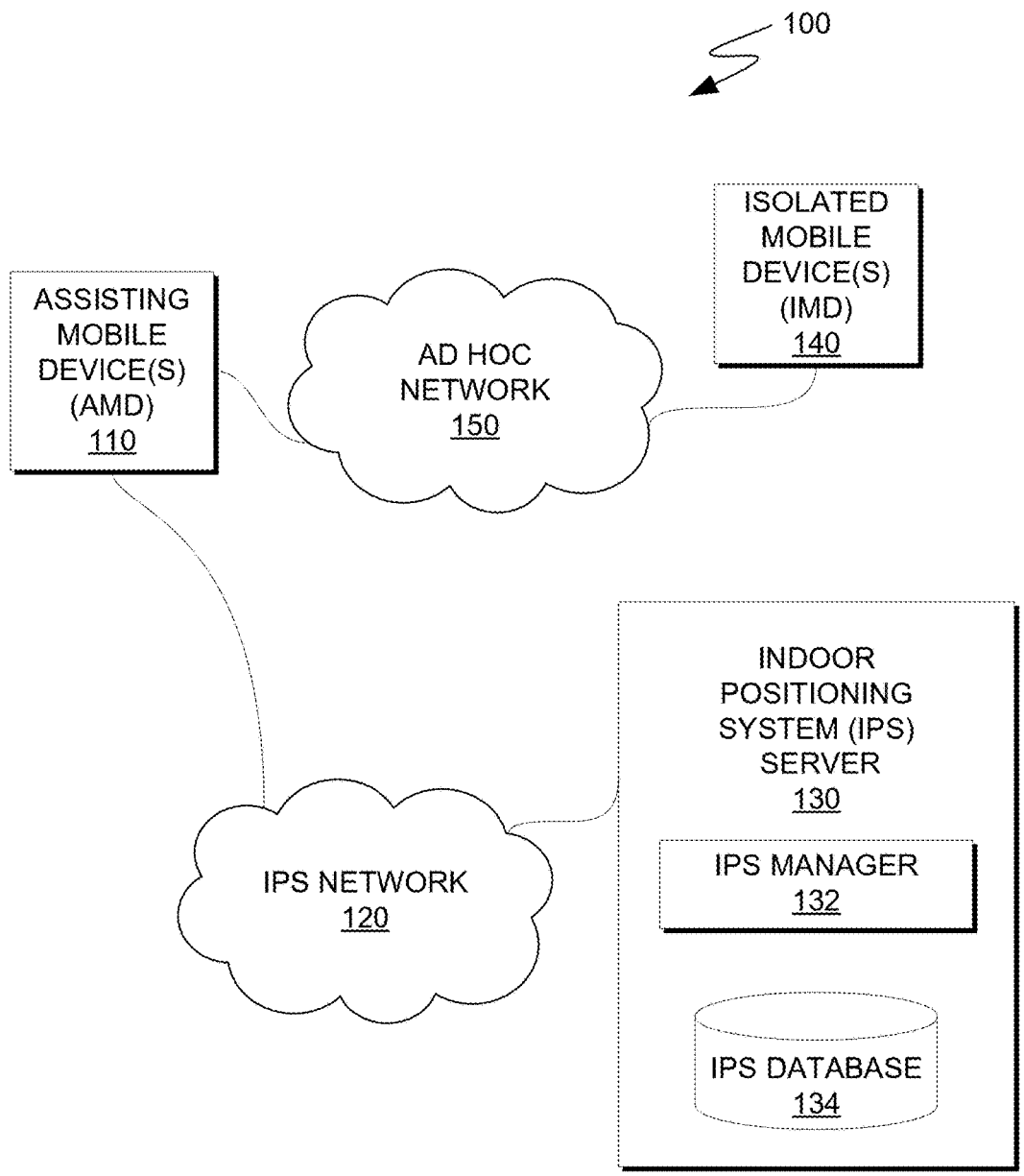
FIG. 1 is a functional block diagram of a computing environment, in accordance with an embodiment of the present disclosure.

Embodiments of the present invention will now be described in detail with reference to the Figures. FIG. 1 is a functional block diagram illustrating a computing environment, in accordance with an embodiment of the present invention. For example, FIG. 1 is a functional block diagram illustrating computing environment 100.

Computing environment 100 includes assisting mobile device 110, isolated mobile device 140, and IPS server 130. Assisting mobile device 110 is connected to both isolated mobile device 140 (via ad hoc network 150) and IPS server 130 (via IPS network 120). IPS server 130 includes IPS manager 132 and IPS database 134. In some embodiments, computing environment 100 includes a plurality of assisting mobile devices 110. In some embodiments, computing environment 100 includes a plurality of isolated mobile devices 140.

In one embodiment, assisting mobile device 110 is a mobile computing device. For example, assisting mobile device 110 may be a smartphone, tablet, or mobile digital media player. In various embodiments, assisting mobile device 110 is a computing device that can be a standalone device, a wearable computing device, a server, a laptop computer, a tablet computer, a netbook computer, a personal computer (PC), or a desktop computer. In another embodiment, assisting mobile device 110 represents a computing system utilizing clustered computers and components to act as a single pool of seamless resources.

In some embodiments, an assisting mobile device is a device that augments the ability of isolated mobile device 140 to connect with ad hoc network 150 or IPS network 120. For example, an assisting mobile device may be a near field communication (NFC) device of an NFC-enabled shopping cart, a bar code scanners, point-of-sale (POS) device or one or more sensors that can capture an image of a user of an isolated mobile device in order to allow for determinations of an isolated customer's disposition, mood, or other similar details which may enable analyses designed to enhance a customer's experience.

In general, assisting mobile device 110 can be any computing device or a combination of devices with access to IPS server 130, through IPS network 120, and isolated mobile device 140, through ad hoc network 150. Assisting mobile device 110 may include internal and external hardware components, as depicted and described in further detail with respect to FIG. 4.

In one embodiment, isolated mobile device 140 is a mobile computing device. For example, assisting mobile device 110 may be a smartphone, tablet, or mobile digital media player. In various embodiments, isolated mobile device 140 is a computing device that can be a standalone device, a wearable computing device, a server, a laptop computer, a tablet computer, a netbook computer, a personal computer (PC), or a desktop computer. In another embodiment, isolated mobile device 140 represents a computing system utilizing clustered computers and components to act as a single pool of seamless resources. In general, isolated mobile device 140 can be any computing device or a combination of devices with one or more network-transmittable identifiers (e.g., a media access control (MAC) address, Bluetooth address, NFC chip ID, serial number), access to ad hoc network 150 (and assisting mobile device 110), and no access to IPS network 120. An assisting mobile device can provide one or more of the network-transmittable identifiers of an isolated mobile device to an indoor positioning system. The isolated mobile device may have privacy settings that govern what identifiers are network-transmittable. For example, a privacy setting of isolated mobile device 140 allows transmission of a Bluetooth address but not a MAC address. In this case, assisting mobile device 130 provides the Bluetooth address to IPS network 120 and, based on the privacy settings, does not receive the MAC address. Isolated mobile device 140 may include internal and external hardware components, as depicted and described in further detail with respect to FIG. 4.

Ad hoc network 150 can be, for example, a personal area network (PAN), supported through devices with short-range wireless communication capability or any other network that does not rely on a preexisting network infrastructure, and may include wired, wireless, fiber optic or any other connection known in the art. In general, ad hoc network 150 can be any combination of connections (e.g., a wireless local area network (WLAN)) utilizing any of various standards and protocols (e.g., 802.11 wireless, 3G, 4G, Bluetooth) that will support communications to and from assisting mobile device 110, in accordance with a desired embodiment of the present invention, and prohibit communications to and from IPS network 120. For example, if IPS network 120 is a network that utilizes only a first wireless communications standard and ad hoc network 150 is a PAN utilizing a second wireless communication standard, then isolated mobile device 140 is any mobile device within computing environment 100 utilizing the second standard but not the first standard, whether due to isolated mobile device 140 lacking the capability (e.g., a compatible antenna) to communicate via the second standard or due to isolated mobile device 140 being configured to disable communications via the second standard. A mobile device is said to be "incompatible" with a network if the mobile device and the network utilize different communications technologies, standards, or protocols, such that the mobile device is unable to communicate via the network irrespective of signal strength.

In various embodiments, IPS server 130 is a computing device that can be a standalone device, a server, a laptop computer, a tablet computer, a netbook computer, a personal computer (PC), or a desktop computer. In another embodiment, IPS server 130 represents a computing system utilizing clustered computers and components to act as a single pool of seamless resources. In general, IPS server 130 can be any computing device or a combination of devices with access to assisting mobile device 110 and with access to and/or capable of executing IPS manager 132 and IPS database 134. IPS server 130 may include internal and external hardware components, as depicted and described in further detail with respect to FIG. 4.

In this embodiment, IPS manager 132 and IPS database 134 are stored on IPS server 130. In other embodiments, one or both of IPS manager 132 and IPS database 134 may reside on another computing device, provided that each can access and is accessible by each other, and provided that IPS manager 132 can access IPS network 120. In yet other embodiments, one or both of IPS manager 132 and IPS database 134 may be stored externally and accessed through a communication network, such as IPS network 120. IPS network 120 can be, for example, a local area network (LAN), a wide area network (WAN) such as the Internet, or a combination of the two, and may include wired, wireless, fiber optic or any other connection known in the art. In general, IPS network 120 can be any combination of connections (e.g., a wireless local area network (WLAN)) utilizing any of various standards and protocols (e.g., 802.11 wireless, 3G, 4G, Bluetooth) that will support communications to and from assisting mobile device 110, in accordance with a desired embodiment of the present invention. IPS network 120 communicates via one or more wireless communications standards. In one embodiment, IPS network 120 is a WLAN based on the 802.11 standards of the Institute of Electrical and Electronics Engineers (IEEE), which is referred to herein as WLAN.

IPS manager 132 operates to identify, track, and communicate with mobile devices within environment 100. For example, IPS manager 132 identifies, tracks, and communicates with one or more assisting mobile devices 110 (devices that are connected to IPS network 120) and IPS manager 132 identifies and tracks one or more isolated mobile devices 140 (devices that are not connected to IPS network 120), using information from the one or more assisting mobile devices 110. In various embodiments, IPS manager 132 detects assisting mobile device 110, identifies a location of assisting mobile device 110, tracks movements of assisting mobile device 110, receives unique identification information about isolated mobile device 140 from assisting mobile device 110, stores the unique identification information about isolated mobile device 140 into database 134, creates a unique ID for isolated mobile device 140, tracks movements of isolated mobile device 140, determines an estimated location of isolated mobile device 140, updates the estimated location of isolated mobile device 140, sends information to assisting mobile device 110, or any combination thereof.

IPS database 134 is a data repository that may be written to and read by IPS manager 132. Data pertinent to one or more assisting mobile devices 110 and one or more isolated mobile devices 140 (e.g., unique identifiers, location history), information relevant to environment 100 (e.g., location of network devices, operational status of network devices, data (e.g., advertisements or coupons) that will be transmitted to one or more assisting mobile devices 110, and other operational data may be stored to IPS database 134. In some embodiments, IPS database 134 may be written to and read by programs and entities outside of computing environment 100 in order to populate the repository.

Figure 2:
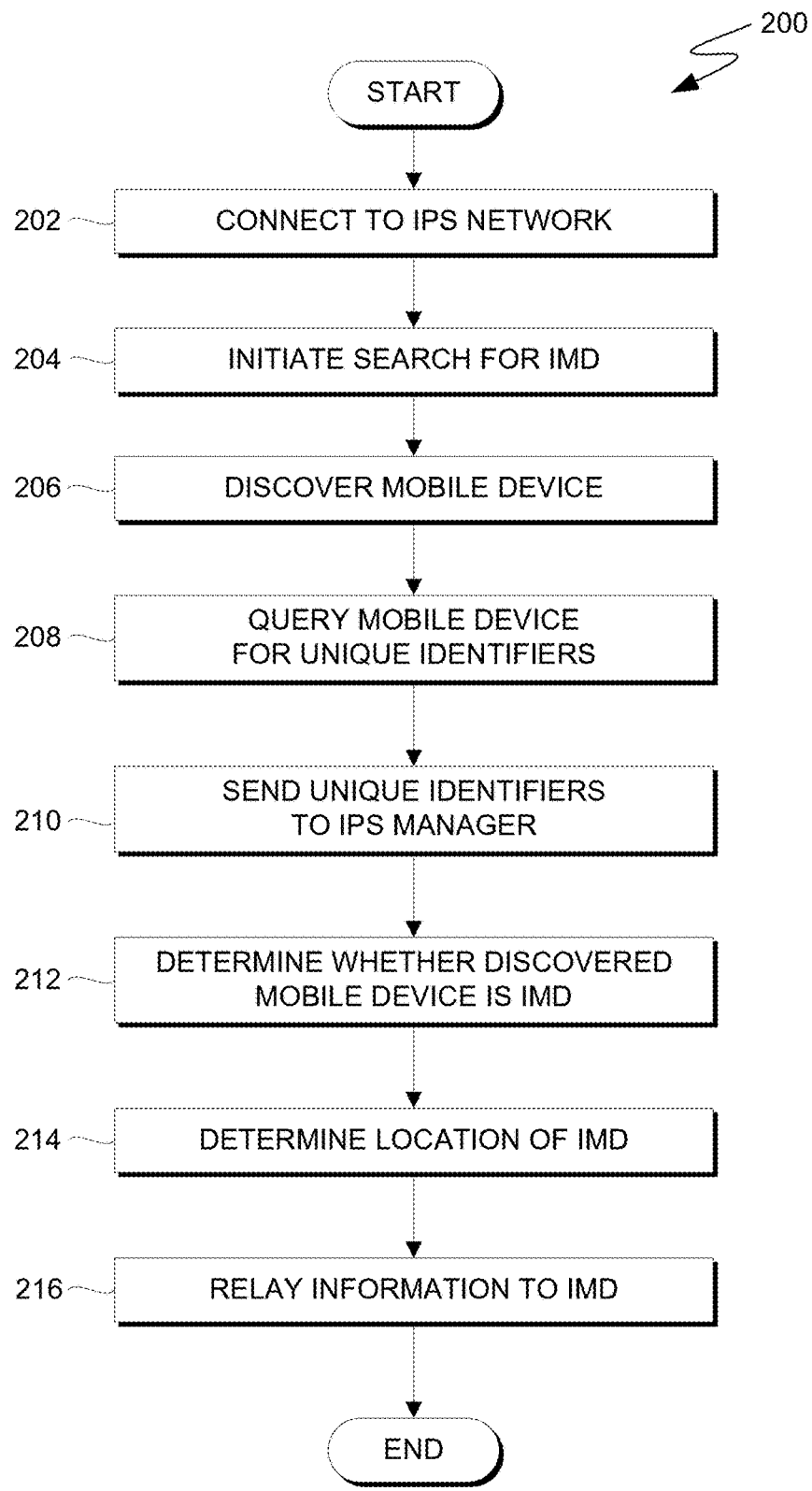
FIG. 2 is a flowchart depicting operations for locating and communicating with isolated mobile devices in indoor positioning systems, in accordance with an embodiment of the present disclosure.

FIG. 2 is a flowchart depicting operations for communicating with isolated mobile devices in indoor positioning systems, in accordance with an embodiment of the present disclosure. For readability, assisting mobile device 110 may be referred to as, and used interchangeably with, AMD 110. Isolated mobile device 140 may be referred to as, and used interchangeably with, IMD 140.

In operation 202, AMD 110 connects to an IPS network. In one embodiment, responsive to detecting the presence of IPS network 120, AMD 110 connects to IPS network 120. For example, a user of AMD 110 enters a designated environment (e.g., a shopping mall, an airport) in which there is an active IPS network. The user of AMD 110 comes within range of IPS network 120, AMD 110 detects the presence of IPS network 120 and automatically makes a wireless connection via a standard utilized by both AMD 110 and IPS network 120. In another embodiment, AMD 110 connects to an IPS network in response to a connection request from IPS manager 132.

In operation 204, AMD 110 initiates a search for IMD 140. In one embodiment, assisting mobile device 110 initiates a querying protocol responsive to connecting to IPS network 120. For example, AMD 110 may be a registered device in IPS environment 100, wherein AMD 110 includes a feature or application that enables AMD 110 to detect mobile devices within a discoverable proximity. In one embodiment, assisting mobile device 110 initiates a querying protocol responsive to receiving a query initiation request from IPS manager 132. In a further embodiment, assisting mobile device 110 queries for isolated mobile device 140 using a discoverable protocol. For example, assisting mobile device 110 utilizes Bluetooth discovery techniques to identify whether at least one mobile device is within range of assisting mobile device 110 and is detectable.

In operation 206, AMD 110 discovers a mobile device, sometimes referred to as a "discovered mobile device". For example, a user of a mobile device enters communications range of ad hoc network 150, which puts the mobile device within communication range of AMD 110. If the mobile device includes at least one active wireless signal of a compatible technology in which AMD 110 is broadcasting a querying signal, it can be discovered by AMD 110. In one embodiment, the discovered mobile device is an isolated mobile device (i.e., an IMD 140). In another embodiment, the discovered mobile device is an assisted mobile device (i.e., an AMD 110). The determination of whether the discovered mobile device is and IMD 140 or an AMD 110 is described in a subsequent operation description. In one embodiment, the discovered mobile device is a registered mobile device within the designated environment.

In some embodiments, a mobile device may be discovered by two or more assisting mobile devices 110 within a designated environment. For example, an isolated mobile device may be "handed off" from a first assisting mobile device to a second assisting mobile device as the user of the isolated mobile device progresses through the designated environment. For example, the first assisting mobile device may first detect and report the presence of the isolated mobile device. At a later time, the second assisting mobile device detects and reports the presence of the isolated mobile device. Because the isolated mobile device was previously reported, IPS manager 132 does not double-count the isolated mobile device.

Known techniques can be used to optionally hand-off the isolated mobile device from a first assisting mobile device to a second assisting mobile device in response to the connection between the first assisting mobile device and the isolated mobile device weakening below a predetermined threshold. For example, over the course of time, the ad hoc network connection between the first assisting mobile device and the isolated mobile device may weaken. The isolated mobile device could be handed off only after the first assisting mobile device 110 loses a connection with the isolated mobile device. The isolated mobile device could be handed off from one assisting mobile device to another assisting mobile device such that the strongest connection (ad hoc network) is maintained between the isolated mobile device and one of the assisting mobile devices. In another example, a preset connection strength threshold could be established that governs the predetermined threshold based on which the isolated mobile devices connect and disconnect from assisting mobile devices.

In operation 208, AMD 110 queries the discovered mobile device for unique identifiers. For example, AMD 110 queries the discovered mobile device for a subscriber identity module (SIM) card identifier, a unique machine address, or another unique identifier that would not compromise identify information about the user of the discovered mobile device. In one embodiment, responsive to querying the discovered mobile device, AMD 110 receives unique identifying information about the discovered mobile device. For example, responsive to detecting the discovered mobile device using Bluetooth technology to establish ad hoc network 150, AMD 110 queries the mobile device for a unique Bluetooth address and receives the unique Bluetooth address in response. In another example, AMD 110 determines that the discovered mobile device is an NFC-enabled device, and, responsive to establishing an NFC peer-to-peer connection, AMD 110 queries the discovered mobile device for an NFC ID and receives the NFC ID in return. In another embodiment, IMD 140 sends unique identifier information to AMD 110, responsive to receiving a signal from AMD 110, requesting that IMD 140 allow detection.

In operation 210, AMD 110 sends unique identifiers gathered in operation 208 to IPS manager 132. In one embodiment, AMD 110 sends one or more unique identifiers of the discovered mobile device to IPS manager 132. In some embodiments, AMD 110 sends additional information to IPS manager 132 regarding an ad hoc network 150 connection between AMD 110 and the discovered mobile device. For example, if AMD 110 includes sensors capable of determining orientation (e.g., compass) and the ability to measure a time delay between sending and receiving wireless signals, AMD 110 may derive an approximate location of the discovered mobile device using these two metrics together, and send the location information to IPS manager 132. In another embodiment of operation 210, AMD 110 queries IPS manager 132, to determine whether a discovered mobile device is connected to IPS network 120. In a further embodiment, AMD 110 sends no unique identifiers about the discovered mobile device responsive to receiving confirmation from IPS manager 132 that the discovered mobile device is currently connected to IPS network 120.

In operation 212, IPS manager 132 determines whether the discovered mobile device is an isolated mobile device. IPS manager 132 logs the information associated with this discoverable event (e.g., unique identifiers, timestamp, AMD 110 identifier, AMD 110 location) into database 134 (or another storage location or registry). IPS manager 132 compares each of the one or more unique identifiers received from AMD 110 to each of the one or more unique identifiers previously stored in database 134. If IPS manager 132 finds a match between the newly received unique identifier and a unique identifier previously obtained, AMD 110 determines whether additional identifiers and data (e.g., WLAN identifiers, recent location data for the discovered mobile device) indicate that the discovered mobile device is currently connected to IPS network 120. For example, if IPS manager 132 correlates one of the newly received unique identifiers with a device whose MAC address is known, IPS manager 132 determines whether the discovered mobile device is currently connected to IPS network 120.

In one embodiment, IPS manager 132 determines that the discovered mobile device is an isolated mobile device. For example, IPS manager 132 determines that the discovered mobile device is not currently connected to IPS network 120 and is therefore an isolated mobile device. In one embodiment, IMD 140 is registered with IPS manager 132, but is incompatible with IPS network 120. In this case, IPS manager 132, responsive to receiving information from AMD 110, such as one or more identifiers of IMD 140, associates the identifiers with a record corresponding to IMD 140. For example, IPS manager 132 associates the identifiers with a record created in connection with registration of IMD 140.

In some embodiments, IPS manager 132 assigns a unique identifier to a discovered mobile device responsive to determining that the discovered mobile device is not a device that has previously been registered, detected, or identified in any way within IPS environment 100. In another embodiment, IPS manager 132 determines that the discovered mobile device is currently connected to IPS network 120 and is a second assisting mobile device 110. In some embodiments, responsive to determining that the discovered mobile device is a second assisting mobile device 110, IPS manager 132 skips operations 214 and 216. In embodiments in which IPS manager 132 does not skip one or both of operations 214 and 216, IPS manager 132 processes operations 214 and 216 as though the second assisting mobile device 110 were an isolated mobile device.

In some embodiments of operation 212, a discovered mobile device may be an isolated mobile device for one or more time periods and an assisting mobile device for one or more time periods while within the designated environment. For example, a user enters a designated environment with a mobile device that has been registered with IPS manager 132 at one point in the past. In this example, the mobile device has multiple wireless technologies enabled and active, connects via a WLAN standard to IPS network 120, and becomes, by earlier definition, an assisting mobile device (i.e., AMD 110). If, during the timeframe in which the user is in the designated environment, the WLAN connection between the mobile device and IPS network 120 is broken (for example, due to the mobile device powering down), the mobile device, by definition, becomes an isolated mobile device.

In operation 214, IPS manager 132 determines a location of the discovered mobile device. In one embodiment, IPS manager 132 approximates or estimates a location of the discovered mobile device based, in part, on determining a location of the assisting mobile device from which IPS manager 132 received unique identifiers of the discovered mobile device. For example, if IPS manager 132 previously determined that AMD 110 is employing class 2 Bluetooth technology, under which another Bluetooth device can be detected within ten meters, then IPS manager 132 calculates that IMD 140 was within ten meters of AMD 110 at the time at which AMD 110 detected a Bluetooth signal emanating from IMD 140.

In another example, as IPS manager 132 receives information regarding detection of the isolated mobile device at two different points (either from two separate assisting mobile devices or from one assisting mobile device that formed an ad hoc network with the isolated mobile device in two different locations), IPS manager 132 uses a mathematical technique like triangulation to more precisely calculate a location of the isolated mobile device.

Depending on the number of different data points from which one or more assisting mobile devices provide unique identifier information, IPS manager 132 may use other techniques to approximate, localize, finely-tune, or update a location determination for the isolated mobile device. A person skilled in the art will recognize that positioning systems may use one or more techniques to determine locations for isolated mobile devices within the IPS environment.

In another embodiment of operation 214, IPS receives information from a network device (e.g., POS device, a network detecting node) about IMD 140. For example, a user of IMD 140 pays for goods using an NFC chip within IMD 140. The POS device detects the NFC chip, gathers a unique device identifier of the NFC chip, and relays that information to IPS manager 132. IPS manager 132 receives that information, searches IPS database 134 (or any other storage location or registry) for the unique identifier, and associates the information received from the POS device (e.g., timestamp, goods purchased by the user) with the information about IMD 40 that is already in the database.

IPS manager 132 logs the location information in database 134.

In operation 216, IPS manager 132 relays information to IMD 140 through a device connected to IPS network 120. In one embodiment, IPS manager 132 relays information to IMD 140 using AMD 110 as a proxy. For example, IPS manager 132 may send an encapsulated signal through AMD 110 to IMD 140, wherein the signal contains information specifically designed for the user of IMD 140. For example, based on data analytics performed on trends in purchases made using the isolated mobile device, IPS manager 132 may send a coupon for a product that IMD 140 may be interested in purchasing. The signal may be encrypted so that it can only be displayed on IMD 140, increasing the privacy of information about the user of IMD 140. Similarly, IPS manager 132 may use location information about IMD 140 to route messages and offers to IMD 140 at kiosks or other displays in the proximity of IMD 140.

In another embodiment, IPS manager 132 relays information to IMD 140 through a POS device that connects to IMD 140. For example, upon checking out using an NFC-enabled mobile device, a user of IMD 140 may receive a coupon for a product that IPS manager 132 determined would be of interest to the user of IMD 140.

As will be understood by a person skilled in the art, IPS manager 132 may send messages and offers to assisting mobile devices, either directly or to kiosks or other displays in the proximity of the assisting mobile devices.

Figure 3:
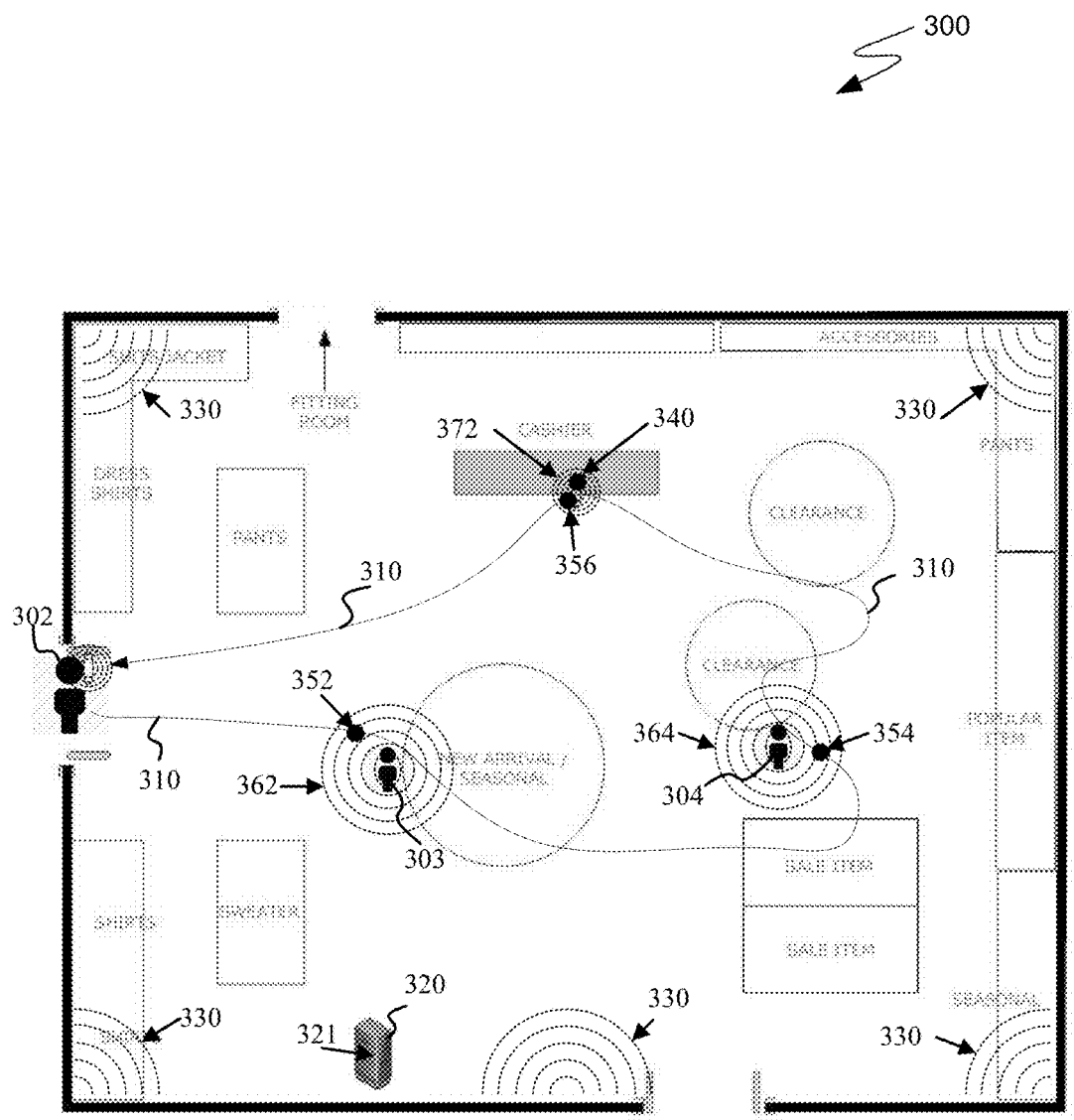
FIG. 3 is an illustration depicting an example implementation of locating and communicating with isolated mobile devices in indoor positioning systems, in accordance with an embodiment of the present disclosure.

FIG. 3 is a map diagram depicting one example of detecting and locating an isolated mobile device in an indoor positioning system environment, in accordance with an embodiment of the present disclosure.

FIG. 3 illustrates a floorplan diagram depicting one example of an implementation of environment 100. In this example, environment 300 includes an IPS within a retail store (referenced as "the store"), wherein the store includes multiple areas of merchandise for sale (e.g., shirts, new arrival/seasonal, clearance). The IPS of the store includes an IPS store server 320 (an example of IPS server 130) which includes an IPS manager 321 (an example of IPS manager 132) that detects and communicates with devices that are connected to IPS network 330 (an example of IPS network 120). In the depicted example, a mobile device of shopper 302 has an active connection that uses a protocol or signal other than that used by IPS network 330. In this case, the mobile device may have one or more active communications device, but none of the active communications devices of the mobile device are compatible with IPS network 330, in which case the mobile device is unable to connect to IPS network 330. The mobile devices of shoppers 303 and 304 are each connected to the store's IPS network 330 and each mobile device also has Bluetooth active. The mobile device of shopper 304 also contains an NFC-enabled chip. By prior definitions, the mobile device of shopper 302 is an isolated mobile device (an example of IMD 140) and the mobile devices of shoppers 303 and 304 are assisting mobile devices (examples of AMD 110). To simplify discussion of this exemplary implementation, the mobile devices of shoppers 302, 303, and 304 will be referred to as IMD 302, AMD 303, and AMD 304 respectively. The store also includes POS device 340. In one embodiment, POS device 340 is an NFC-enabled device that allows shoppers to pay with an NFC-enabled mobile device.

Shopper 302 enters the store and begins travelling through the store on path 310. At location point 352, shopper 302 is approaching shopper 303, and enters Bluetooth ad hoc network 362 (i.e., an example of ad hoc network 150), which puts IMD 302 within communication range of the AMD 303. AMD 303 discovers IMD 302 using Bluetooth technology (see operation 206) and queries IMD 302 for unique identifiers (see operation 208). AMD 303 receives a unique Bluetooth address of IMD 302 and sends the unique Bluetooth address to IPS manager 321 (see operation 210) over wireless network 330. IPS manager 321 determines that IMD 302 is an IMD for which there is no existing data (see operation 212). IPS manager 321 creates a unique store identifier for shopper 302, logs information into the store's database on server 320, and determines that IMD 302 (and shopper 302) is near or at location 352 (see operation 214), based on knowing the position of shopper 303.

Shopper 302 continues along path 310, moving through the new arrival/seasonal section of the store, into and out of a sale item section of the store, and toward shopper 304. At location point 354, shopper 302 enters ad hoc network 364, the wireless ad hoc network of shopper 304, which puts IMD 302 within communication range of AMD 304. AMD 304 discovers IMD 302 and queries IMD 302 for unique identifiers. AMD 304 receives the unique Bluetooth address and, in addition, a unique NFC identifier of IMD 302, and sends both unique identifiers to IPS manager 321 over wireless network 330. IPS manager 321 determines that IMD 302 has previously been detected, and determines that IMD 302 is currently near or at location 354. IPS manager 321, having two location data points for shopper 302, may correlate that information with information about the layout of merchandise in the store to determine what merchandise shopper 302 was likely to have been near.

Shopper 302 continues along path 310 and stops at location 356 to purchase goods with the assistance of a cashier that is using POS device 340. Shopper 302, learning that the store offers customers the ability to pay with NFC-enabled mobile devices, chooses to use the NFC chip in IMD 302 to pay for the goods. IMD 302 makes a connection with NFC ad hoc network 372 and completes the purchase transaction. POS device 340 captures the NFC ID of IMD 302 and transmits that information to IPS manager 321. IPS manager 321 receives that information, and logs it into the store database with prior data about IMD 302 (as received from AMD 303 and AMD 304).

Depending on timestamp information associated with the information from shoppers 303 and 304, and POS device 340, IPS manager 321 may perform analytics to determine how to improve the experience of shopper 302. For example, IPS manager 321 may provide real-time targeted marketing or advertising to shopper 302 or balance store staff positions to improve shopper 302's experience. During checkout or at a future point in time, IPS manager 321 may send, using POS device 340, AMD 303 or AMD 304, or any other assisting mobile device within the store as a proxy, coupons or other store-related information to shopper 302, based on results of analytics performed using data gathered about the shopping experience of shopper 302.

Figure 4:
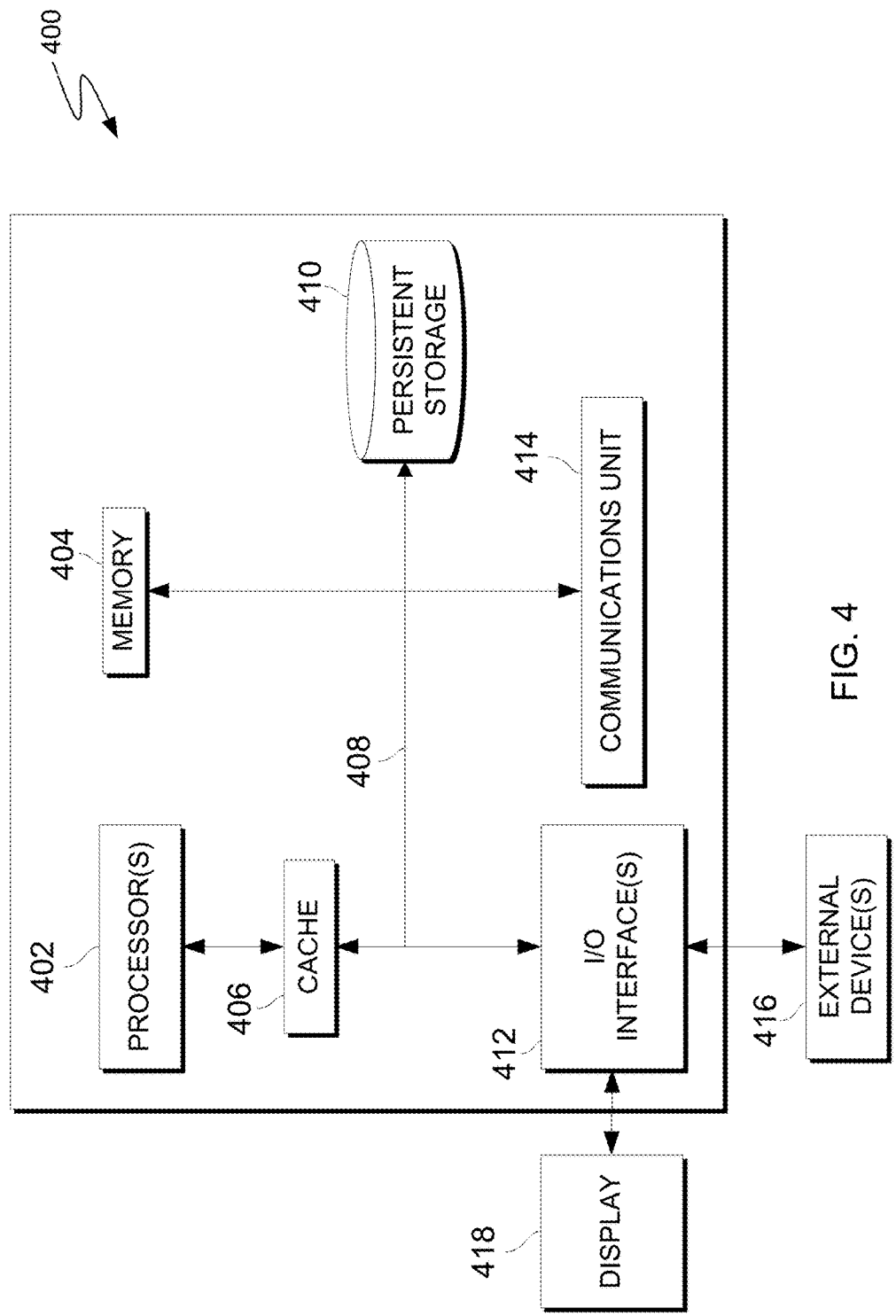
FIG. 4 is a block diagram of components of a computing device executing operations for locating and communicating with isolated mobile devices in indoor positioning systems, in accordance with an embodiment of the present disclosure.

FIG. 4 is a block diagram of components of a computing device, generally designated 400, in accordance with an embodiment of the present invention. In one embodiment, computing system 400 is representative of IPS server 130 within computing environment 100, in which case IPS server 130 includes IPS manager 132 and IPS database 134.

It should be appreciated that FIG. 4 provides only an illustration of one implementation and does not imply any limitations with regard to the environments in which different embodiments may be implemented. Many modifications to the depicted environment may be made.

Computing system 400 includes processor(s) 402, cache 406, memory 404, persistent storage 410, input/output (I/O) interface(s) 412, communications unit 414, and communications fabric 408. Communications fabric 408 provides communications between cache 406, memory 404, persistent storage 410, communications unit 414, and input/output (I/O) interface(s) 412. Communications fabric 408 can be implemented with any architecture designed for passing data and/or control information between processors (such as microprocessors, communications and network processors, etc.), system memory, peripheral devices, and any other hardware components within a system. For example, communications fabric 408 can be implemented with one or more buses or a crossbar switch.

Memory 404 and persistent storage 410 are computer readable storage media. In this embodiment, memory 404 includes random access memory (RAM). In general, memory 404 can include any suitable volatile or non-volatile computer readable storage media. Cache 406 is a fast memory that enhances the performance of processor(s) 402 by holding recently accessed data, and data near recently accessed data, from memory 404.

Program instructions and data used to practice embodiments of the present invention may be stored in persistent storage 410 and in memory 404 for execution by one or more of the respective processor(s) 402 via cache 406. In an embodiment, persistent storage 410 includes a magnetic hard disk drive. Alternatively, or in addition to a magnetic hard disk drive, persistent storage 410 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 410 may also be removable. For example, a removable hard drive may be used for persistent storage 410. Other examples include optical and magnetic disks, thumb drives, and smart cards that are inserted into a drive for transfer onto another computer readable storage medium that is also part of persistent storage 410.

Communications unit 414, in these examples, provides for communications with other data processing systems or devices. In these examples, communications unit 414 includes one or more network interface cards. Communications unit 414 may provide communications through the use of either or both physical and wireless communications links. Program instructions and data used to practice embodiments of the present invention may be downloaded to persistent storage 410 through communications unit 414.

I/O interface(s) 412 allows for input and output of data with other devices that may be connected to each computer system. For example, I/O interface(s) 412 may provide a connection to external device(s) 416 such as a keyboard, keypad, a touch screen, and/or some other suitable input device. External device(s) 416 can also include portable computer readable storage media such as, for example, thumb drives, portable optical or magnetic disks, and memory cards. Software and data used to practice embodiments of the present invention can be stored on such portable computer readable storage media and can be loaded onto persistent storage 410 via I/O interface(s) 412. I/O interface(s) 412 also connect to display 418.

Display 418 provides a mechanism to display or present data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The term(s) "Smalltalk", "Bluetooth", and the like may be subject to trademark rights in various jurisdictions throughout the world and are used here only in reference to the products or services properly denominated by the marks to the extent that such trademark rights may exist. As used herein, the term "Bluetooth" refers to the wireless communication standard managed by the Bluetooth Special Interest Group. The term "Bluetooth" is a registered trademark of Bluetooth SIG, Inc.

The term "exemplary" means of or relating to an example and should not be construed to indicate that any particular embodiment is preferred relative to any other embodiment.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   sending, by a server, a query toward a first mobile device, wherein:
      the query is directed toward a set of information about a second mobile device; and
      the server is not connected to the second mobile device;
   receiving, by the server, the set of information about the second mobile device from the first mobile device;
   determining, by the server, an estimated location of the second mobile device based, at least in part, on a location of the first mobile device; and
   performing, by the server, in response to determining the estimated location of the second mobile device, analytics on the set of information about the second mobile device to provide real-time targeted information to the second mobile device via the first mobile device.

2. The method of claim 1, further comprising:
   receiving, by the server, additional information from a third mobile device, wherein the third mobile device is connected to both the server the second mobile device; and
   updating, by the server, the estimated location of the second mobile device based, at least in part, on a location of the third mobile device.

3. The method of claim 1, wherein:
   the server and the first mobile device are connected via a first wireless communications protocol of a first network; and
   the first mobile device and the second mobile device are connected via a second wireless communications protocol of a second network.

4. The method of claim 3, wherein:
   the first network is an indoor positioning system network; and
   the second network is an ad hoc network.

5. The method of claim 1, wherein:
   the set of information includes one or more network transmittable identifiers of the second mobile device; and
   each of the one or more network transmittable identifiers identifies the second mobile device.

6. The method of claim 5, wherein:
   each of the one or more network transmittable identifiers uniquely identifies the second mobile device; and
   the one or more network transmittable identifiers include at least one of a machine address, a media access control address, a Bluetooth identifier, or a SIM card identifier.

7. A computer program product comprising:
   a computer readable storage medium and program instructions stored on the computer readable storage medium, the program instructions comprising instructions to:
   send, by a server, a query toward a first mobile device, wherein:
      the query is directed toward a set of information about a second mobile device; and
      the server is not connected to the second mobile device;
   receive, by the server, the set of information about the second mobile device from the first mobile device;
   determine, by the server, an estimated location of the second mobile device based, at least in part, on a location of the first mobile device; and
   perform, by the server, in response to determining the estimated location of the second mobile device, analytics on the set of information about the second mobile device to provide real-time targeted information to the second mobile device via the first mobile device.

8. The computer program product of claim 7, further comprising instructions to:

receive, by the server, additional information from a third mobile device, wherein the third mobile device is connected to both the server the second mobile device; and update, by the server, the estimated location of the second mobile device based, at least in part, on a location of the third mobile device.

9. The computer program product of claim 7, wherein:

the server and the first mobile device are connected via a first wireless communications protocol of a first network; and the first mobile device and the second mobile device are connected via a second wireless communications protocol of a second network.

10. The computer program product of claim 9, wherein:

the first network is an indoor positioning system network; and the second network is an ad hoc network.

11. The computer program product of claim 7, wherein:

the set of information includes one or more network transmittable identifiers of the second mobile device; and each of the one or more network transmittable identifiers identifies the second mobile device.

12. The computer program product of claim 11, wherein:

each of the one or more network transmittable identifiers uniquely identifies the second mobile device; and the one or more network transmittable identifiers include at least one of a machine address, a media access control address, a Bluetooth identifier, or a SIM card identifier.

13. A computer system comprising:

one or more computer processors;

one or more computer readable storage media;

program instructions stored on the computer readable storage media for execution by at least one of the one or more processors, the program instructions comprising instructions to:

send, by a server, a query toward a first mobile device, wherein:

the query is directed toward a set of information about a second mobile device; and the server is not connected to the second mobile device;

receive, by the server, the set of information about the second mobile device from the first mobile device;

determine, by the server, an estimated location of the second mobile device based, at least in part, on a location of the first mobile device; and perform, by the server, in response to determining the estimated location of the second mobile device, analytics on the set of information about the second mobile device to provide real-time targeted information to the second mobile device via the first mobile device.

14. The computer system of claim 13, further comprising instructions to:

receive, by the server, additional information from a third mobile device, wherein the third mobile device is connected to both the server the second mobile device; and update, by the server, the estimated location of the second mobile device based, at least in part, on a location of the third mobile device.

15. The computer system of claim 13, wherein:

the server and the first mobile device are connected via a first wireless communications protocol of a first network; and the first mobile device and the second mobile device are connected via a second wireless communications protocol of a second network.

16. The computer system of claim 15, wherein:

the first network is an indoor positioning system network; and the second network is an ad hoc network.

17. The computer system of claim 13, wherein:

the set of information includes one or more network transmittable identifiers of the second mobile device; and each of the one or more network transmittable identifiers identifies the second mobile device.

18. The computer system of claim 17, wherein:

each of the one or more network transmittable identifiers uniquely identifies the second mobile device; and the one or more network transmittable identifiers include at least one of a machine address, a media access control address, a Bluetooth identifier, or a SIM card identifier.

* * * * *